Dec. 10, 1929.    R. B. SHEMITZ ET AL    1,738,801
APPARATUS FOR AND PROCESS OF DETECTING
AND SEGREGATING BACTERIA IN LIQUIDS
Filed Dec. 2, 1926

Inventor
HARRY F. WECHSLER.
REUBEN B. SHEMITZ.
By Their Attorney
Richard B. Owen.

Patented Dec. 10, 1929

1,738,801

UNITED STATES PATENT OFFICE

REUBEN B. SHEMITZ, OF BROOKLYN, AND HARRY F. WECHSLER, OF NEW YORK, N. Y.

APPARATUS FOR AND PROCESS OF DETECTING AND SEGREGATING BACTERIA IN LIQUIDS

Application filed December 2, 1926. Serial No. 152,289.

This invention relates to a process of electrically segregating, separating and detecting bacteria in a solution together with the apparatus for carrying out the process.

A particular object of the invention is to provide a process and apparatus for segregating and detecting the bacteria in a solution by passing an electric current through the solution.

A still further object of the invention is to provide a process and means for segregating bacteria in a solution at a given point.

There is now in use, certain methods of detecting bacteria in solutions involving the use of microscopic instruments but great difficulty has been experienced when an attempt has been made to segregate the bacteria in a solution where such bacteria has not been great enough in number so as to enable their being detected in the solution except by the process of cultivating the same, which process is very tedious and requires an unusual length of time in which to obtain the desired result.

It is our invention, therefore, to provide an apparatus and process which constitutes a new method of segregating and collecting bacteria in a solution so that the same can readily be removed from the solution after segregation and can be examined at will and studied.

Figure 1:
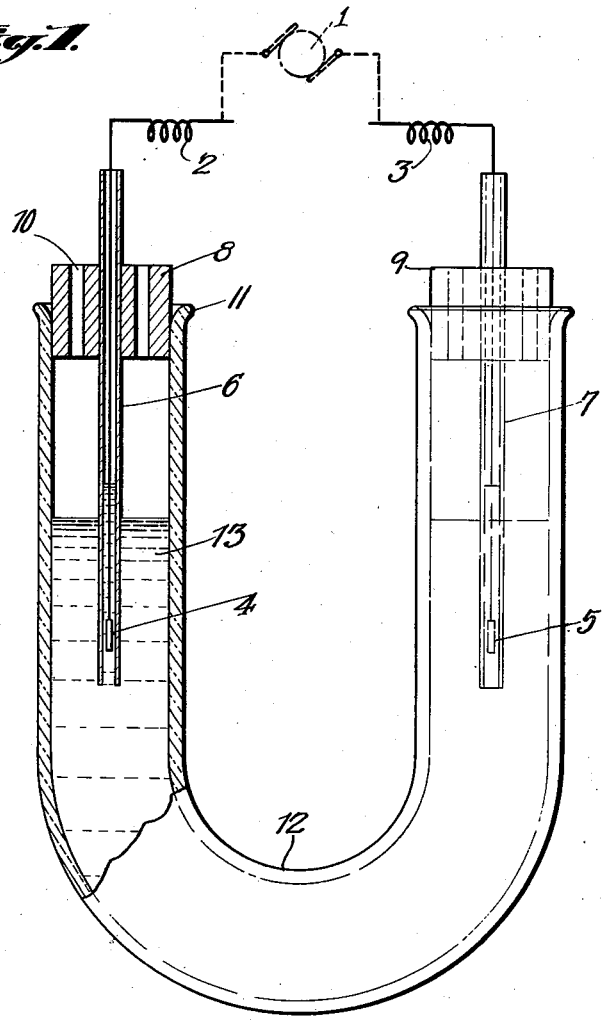
Figure 2:
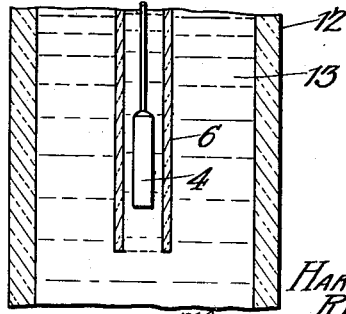

To enable others skilled in the art to fully comprehend the underlying features of our invention that they may embody the same in the various modifications in structure and relation contemplated, a drawing depicting a preferred form has been annexed as a part of this disclosure and in said drawings, similar reference characters denote corresponding parts throughout the views of which, Figure 1 is a view in side elevation of a U-tube showing positioned therein, electrodes, one side of the tube being broken away to show the positioning of the electrode in the liquid contained in the tube, and Figure 2 is an enlarged view in sectional elevation showing the construction of the electrode held within the capillary tube which, in itself is positioned in one arm of the U-tube as shown in Figure 1.

Referring to the drawing in detail, 1 indicates a source of power, such as a generator, from which the electricity is conveyed through the medium of the wires 2 and 3 to the electrode tips 4 and 5 respectively. These electrode tips are positioned at the end of the wires 2 and 3 which are contained within the glass capillary tubes 6 and 7, the electrodes being preferably composed of platinum, in the positive instance, and of zinc in the negative instance, although it is understood that any suitable metal may be used for the negative and positive electrodes, depending upon the condition under which they are to be employed.

The capillary tubes 6 and 7 are passed through and held in the corks 8 and 9 which are provided with suitable air holes 10 and which seal up the upper ends 11 of the U-shaped tube 12, which is arranged to hold the electrolytic solution 13 which contains the bacteria.

It is evident that by the use of capillary tubes 6 and 7, the liquid 13 will assume a higher level therein than the level of the liquid in the U-tube 12, the reason for this being hereinafter explained.

The liquid which is to be tested for the presence of certain bacteria is first treated or mixed with an electrolyte and the solution thus obtained is poured into the U-tube 12. At this point, it is well to take into consideration a certain phase of the process which must be explained. The inventors have found that in the case of segregating different kinds of bacteria, the same electrolyte cannot be used, since no two types of classes of bacteria can give the required result through the use of the same electrolyte and density of solution. For instance, in the testing to determine tuberculosis bacteria, the sputum is mixed with an electrolytic solution consisting of approximately ten percent sodium hydroxide neutralized with twenty per cent hydrochloric acid. The use of phenolphthalein serves as an indicator after the collected bacteria has been placed upon a glass slide or receptacle for closer examination.

In order to determine the presence of bacteria in the solution, the same is poured into the U-tube 12 and this tube is then placed on a rack or bracket so that it is held in upright position. The electrodes with their covering capillary tubes are then inserted through the corks 8, the electrodes being connected to the positive and negative terminals at the generator 1. In this instance, I have not designated either electrode as negative or positive as it is readily understood that one is positive and the other negative. In carrying out the process, the direct current of electricity of suitable voltage and current is used, and this is passed through the electrodes 4 and 5 and through the electrolyte or solution in the U-tube 12. As the electric current passes through this solution and the electrolyte in the U-tube, the bacteria therein contained are attracted to either the negative or the positive electrode, this being governed by the charge of electricity carried by the bacteria in the solution as of course, the electric action is due to the attraction of the ion in each bacteria.

The electricity is allowed to pass between the electrodes and through the solution for various periods of time from one-half hour to five hours, it being of course understood that the bacteria in the solution will gather around and adhere to the electrodes 4 and 5 and also the wire within the capillary tube as high as the electrolyte extends.

After the current has been on a sufficient length of time, the electrodes and capillary tubes are withdrawn from the U-tube 12. It can be seen from this description that since the solution rises higher in the capillary tubes 6 and 7 than the height of the solution in the U-tube that any bacteria which have been segregated by means of attraction exerted by the electrodes will remain in the capillary tube if the tubes themselves are properly and carefully removed.

A finger of the hand sealing the upper end of the capillary tubes while the same are being removed will not allow any of the solution in the capillary tubes to leave the tubes.

The solution about the electrodes in the capillary tubes is highly charged with bacteria, because of the fact that they have been attracted to the electrodes. In this process, if the same is carefully pursued, even slight traces of bacteria in the solution can be detected by reason of the fact that practically all of the bacteria in the electrolyte has been attracted to the electrode and therefore is in the solution that is in the capillary tubes around the electrodes. A microscopic examination of this solution will therefore disclose the presence of any bacteria.

It must be borne in mind that certain bacteria become negatively or positively charged in a given solution depending upon what electrolyte is used with the solution. It therefore stands to reason that an important part of the invention is the electrolytic solution used in conjunction with the apparatus and process of carrying out the detection method, and for the various kinds of bacteria to be detected, different electrolyte solutions must be used in their detection and segregation.

It is to be understood, of course, that the electricity used in this process may be either derived from a motor generator attached to the apparatus in a compact form or the ends of the wires 2 and 3 may be brought to a suitable plug for using the electricity furnished in any building having direct current, it being of course, assumed that some method of controlling the voltage and amperage by rheostat will be available so that the voltage and current can be controlled so as to govern the rise and fall of temperature of the solution to be used in the U-tube 12.

In certain solutions containing electrolyte which contain a dye, the particular bacteria being segregated will assume a different color than the balance of the bacteria in the solution and this feature will also help detect the presence of the particular bacteria.

It is to be understood therefore, that we have provided a new and improved method of detecting bacteria in a solution and have also provided a means for segregating the bacteria at a given point.

Further, we have provided an apparatus and method of using the same through the medium of which any particular type of bacteria in a solution or in a liquid may be segregated and withdrawn from the solution for test purposes.

It is also to be understood that while we have made use of a U-shaped tube for containing the electrolytic solution, it is evident that any receptacle or vessel might just as well be used in connection with which the electrodes could satisfactorily operate and we do not wish to be limited to the specific showing of the U-tube nor of the positioning of the electrodes therein.

While we have illustrated and described our invention with some degree of particularity, we realize that in practice various alterations therein may be made. We therefore reserve the right and privilege of changing the form of the details of construction and the steps of the process, or otherwise altering the arrangement of the correlated parts without departing from the spirit of the invention or the scope of the appended claims.

Having thus described our invention what we claim as new and desire to secure by United States Letters Patent is:—

1. An apparatus for the detection of bacteria comprising a receptacle, a closure therefor, an electrolytic solution in said receptacle with which the bacteria to be detected has been mixed, electrodes positioned in said receptacle and means for passing a current of electricity between said electrodes whereby the bacteria in the solution will be attracted to said electrodes, and electrode surrounding tubes passing through and held in said closure.

2. An apparatus for detecting bacteria comprising a receptacle, capillary tubes in said receptacle, electrodes positioned in said tubes, an electrolyte in the receptacle into which said capillary tubes extend, said electrolyte containing therein the bacteria to be determined, and means for passing a current of electricity through the electrodes and through the electrolytic solution whereby the bacteria will adhere to said electrodes within said capillary tubes.

In testimony whereof we affix our signatures.

REUBEN B. SHEMITZ. [L. S.]
HARRY F. WECHSLER. [L. S.]